United States Patent
White

(10) Patent No.: US 8,061,729 B2
(45) Date of Patent: Nov. 22, 2011

(54) REINFORCED BICYCLE FRAME

(75) Inventor: Philip White, Toronto (CA)

(73) Assignee: Life on the Beach Settlement, a legal entity having as trustee SG Hambros Bank & Trust ( * ) Notice: Subject to any disclaimer, the term of this patent is extended or adjusted under 35 U.S.C. 154(b) by 75 days.

(21) Appl. No.: 11/512,424

(22) Filed: Aug. 30, 2006

(65) Prior Publication Data

US 2008/0054593 A1    Mar. 6, 2008

(51) Int. Cl.
*B62K 19/00* (2006.01)
(52) U.S. Cl. ...................................... 280/281.1; 280/284
(58) Field of Classification Search ............... 280/281.1, 280/284
See application file for complete search history.

(56) References Cited

U.S. PATENT DOCUMENTS

| 5,853,651 | A | * | 12/1998 | Lindsay et al. | 264/512 |
| 5,876,054 | A | * | 3/1999 | Olson et al. | 280/281.1 |
| 6,109,638 | A | | 8/2000 | Colegrove | |
| 6,123,353 | A | * | 9/2000 | Bennett et al. | 280/281.1 |
| 6,293,574 | B1 | * | 9/2001 | Storck | 280/284 |
| 6,994,367 | B2 | * | 2/2006 | Mock et al. | 280/288.1 |
| 7,168,726 | B2 | * | 1/2007 | Klein | 280/284 |
| 2004/0145148 | A1 | * | 7/2004 | Klein | 280/284 |
| 2004/0239070 | A1 | * | 12/2004 | Chao | 280/278 |

FOREIGN PATENT DOCUMENTS

EP    0 063 719    11/1982

* cited by examiner

*Primary Examiner* — Paul N Dickson
*Assistant Examiner* — Tashiana Adams

(57) ABSTRACT

A bicycle frame provided with increased stiffness in one direction without increasing the stiffness in another direction. In particular, a bicycle frame is provided that increases the stiffness in the lateral direction while not increasing the stiffness in the vertical direction.

38 Claims, 15 Drawing Sheets

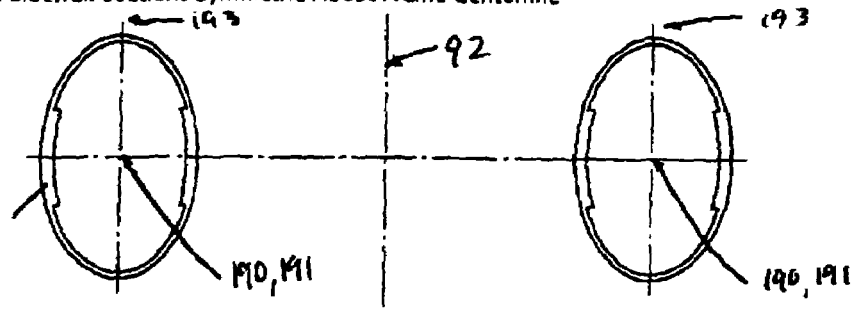
Fig 11: Reinforced Sidewall Sections Symmetric About Frame Centerline
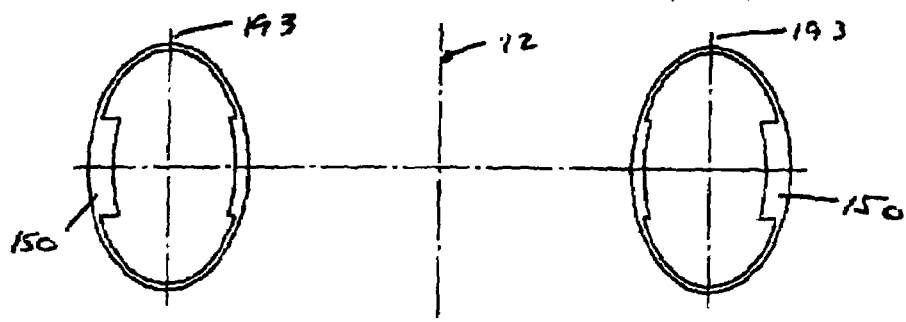
Fig 12: Reinforced Sidewall Sections Symmetric About Frame Centerline (Assymetric)
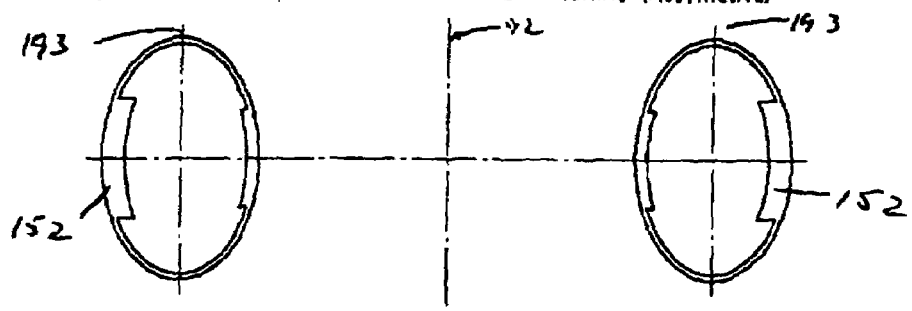
Fig 13: Reinforced Sidewall Sections Symmetric About Frame Centerline (Assymetric)
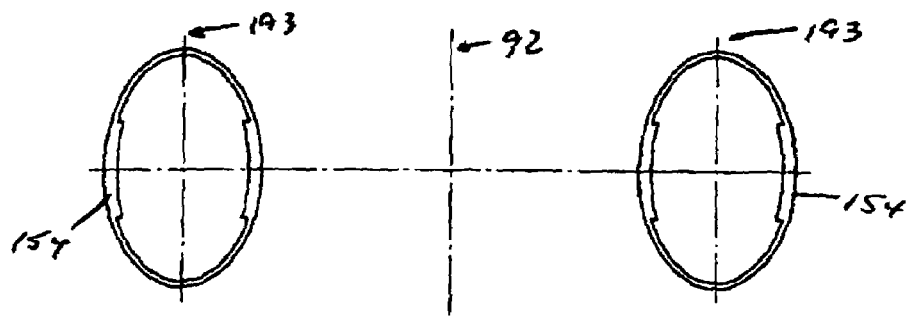
Fig 14: Reinforced Sidewall Sections Symmetric About Frame Centerline (Assymetric)

Rectangle

Camber Sided Rectangle

Camber Sided Triangle

Diamond

REINFORCED BICYCLE FRAME

FIELD OF THE INVENTION

The present invention relates generally to a bicycle frame and more particularly to a bicycle frame with advantageous stiffness. More particularly, the invention relates to a bicycle with increased stiffness in one direction as opposed to another direction of the bicycle frame, preferably with tubes forming the frame having reinforced sidewalls to increase the stiffness in the sides of the tubes. Furthermore, the tubes are made of composite material.

BACKGROUND OF THE INVENTION

Conventional bicycle frames are designed with tubular members of the bicycle frame having a uniform wall thickness. The uniform walls provide uniform stiffness in each direction. Typically, if an increase in stiffness is desired, the thickness of the uniform thickness wall size is increased with the disadvantages of increase in weight and inability to customize the stiffness directionally.

Conventional bicycle frames are also designed with a uniform wall thickness in a cross-section and with differing wall thickness in the longitudinal direction of the bicycle tubes. In particular, a cross-section taken at one point compared to a cross-section taken at a different point in the longitudinal direction may be different when compared to each other. When comparing these different cross-sections, one cross-section may be stiffer because of stiffer material being used or one cross-section may be thicker than the other.

SUMMARY OF THE INVENTION

Accordingly, to at least partially overcome the disadvantages of previously known devices, the present invention provides a bike frame which is selectively reinforced over portions of the frame members, preferably which is reinforced side walls of tubular members forming the frame.

An object of the present invention is to provide a bicycle frame designed to have advantageous stiffness, as with increased stiffness in one direction without increasing stiffness in another direction. In particular, an object of the present invention is to provide a bicycle frame designed to have advantageous stiffness in the lateral direction while not increasing the stiffness in the vertical direction.

Another object of the invention is to increase the stiffness of a bike frame without adding excessive additional weight to the frame.

In accordance with the present invention, a tubular member of a bicycle frame may be provided with additional material along their side walls to reinforce the tubular member. Such reinforced side walls can be provided in one or more of the tubular members of the bicycle frame.

In one aspect, the present invention provides a bicycle frame comprising: a top tube with a front end and a rear end, a head tube with a top end and a lower end, a down tube with a front end and a rear end, a seat tube with a top end and lower end, a pair of chainstays each with a front end and rear end, and a pair of seatstays each with a front end and rear end, the front end of the top tube connected to the top end of the head tube, the front end of the down tube connected to the lower end of the head tube, the top tube and down tube diverging away from each another as they extend rearwardly from the head tube, the rear end of the down tube coupled to the lower end of the seat tube, the rear end of the top tube top connected to the top end of the seat tube, the top tube, head tube, down tube and seat tube substantially forming a closed main frame loop, the head tube adapted to be coupled to a pivotable front fork which carries a front wheel and handlebars, the top tube, head tube, down tube, and seat tube each comprise a tubular member extending about their own longitudinal axis, the longitudinal axis each of the top tube, head tube, down tube, and seat tube tubes lying in a flat longitudinal central plane, each tubular member having by a circumferential wall about their longitudinal axis with the circumferential wall generally symmetrical about the central plane, selected of the tubular members being reinforced tubular members, the circumferential wall of the reinforced tubular members having portions remote from the central plane reinforced to increase the resistance of the reinforced tubular member to lateral out of plane bending compared to in plane bending in the vertical direction, the down tube being a reinforced tubular member. Such a bicycle frame may have: the pair of chainstays comprising a left chainstay and a right chainstay being on opposite sides of the central plane, the pair of seatstays comprising a left seatstay and a right seatstay being on opposite sides of the central plane, the front end of the right chainstay connected to the main frame loop proximate the junction of the seat tube and the down tube on a right side of the central plane, the front end of each of the right seatstays connected to the seat tube on a right side of the central plane spaced upwardly from the front ends of the chainstays, the rear end of the right chainstay connected to the rear end of the right seat stay on the right side of the central plane rearward of the seat tube, the front end of the left chainstay connected to the main frame loop proximate the junction of the seat tube and the down tube on a left side of the central plane, the front end of each of the left seatstays connected to the seat tube on a left side of the central plane spaced upwardly from the front ends of the chainstays, the rear end of the left chainstay connected to the rear end of the left seat stay on the left side of the central plane rearward of the seat tube, the right chainstay, the right seatstay, and the seat tube substantially form a closed right rear frame loop, the left chainstay, the left seatstay, and the seat tube substantially form a closed left rear frame loop, the rear ends of the pair of chainstays adapted to support a rear wheel journalled on an axle extending therebetween normal to the central plane, each chainstay and each seatstay comprise a tubular element extending about their own longitudinal axis, each reinforced tubular element having a circumferential wall about its longitudinal axis with the circumferential wall generally symmetrical at each point along the length of the longitudinal axis about a line of symmetry through the point normal the longitudinal axis and parallel to the central plane, selected of the tubular elements being reinforced tubular elements, the circumferential wall of the reinforced tubular elements having portions remote from the lines of symmetry reinforced to increase the resistance of the reinforced tubular element to resisting out of plane bending compared to in plane bending in a vertical direction, the chain stays each being a reinforced tubular element.

BRIEF DESCRIPTION OF THE DRAWINGS

Further aspects and advantages of the invention will become apparent upon reading the following description together with the accompanying drawings in which:

FIG. 11 is a cross-sectional view along section 11-11' in FIG. 4;

FIG. 12 is a cross-sectional view as in FIG. 11 but showing a second alternate reinforcing construction;

FIG. 13 is a cross-sectional view as in FIG. 11 but showing a third alternate reinforcing construction;

FIG. 14 is a cross-sectional view as in FIG. 11 but showing a fourth alternate reinforcing construction;

DETAILED DESCRIPTION OF THE PREFERRED EMBODIMENTS

Figure 1:
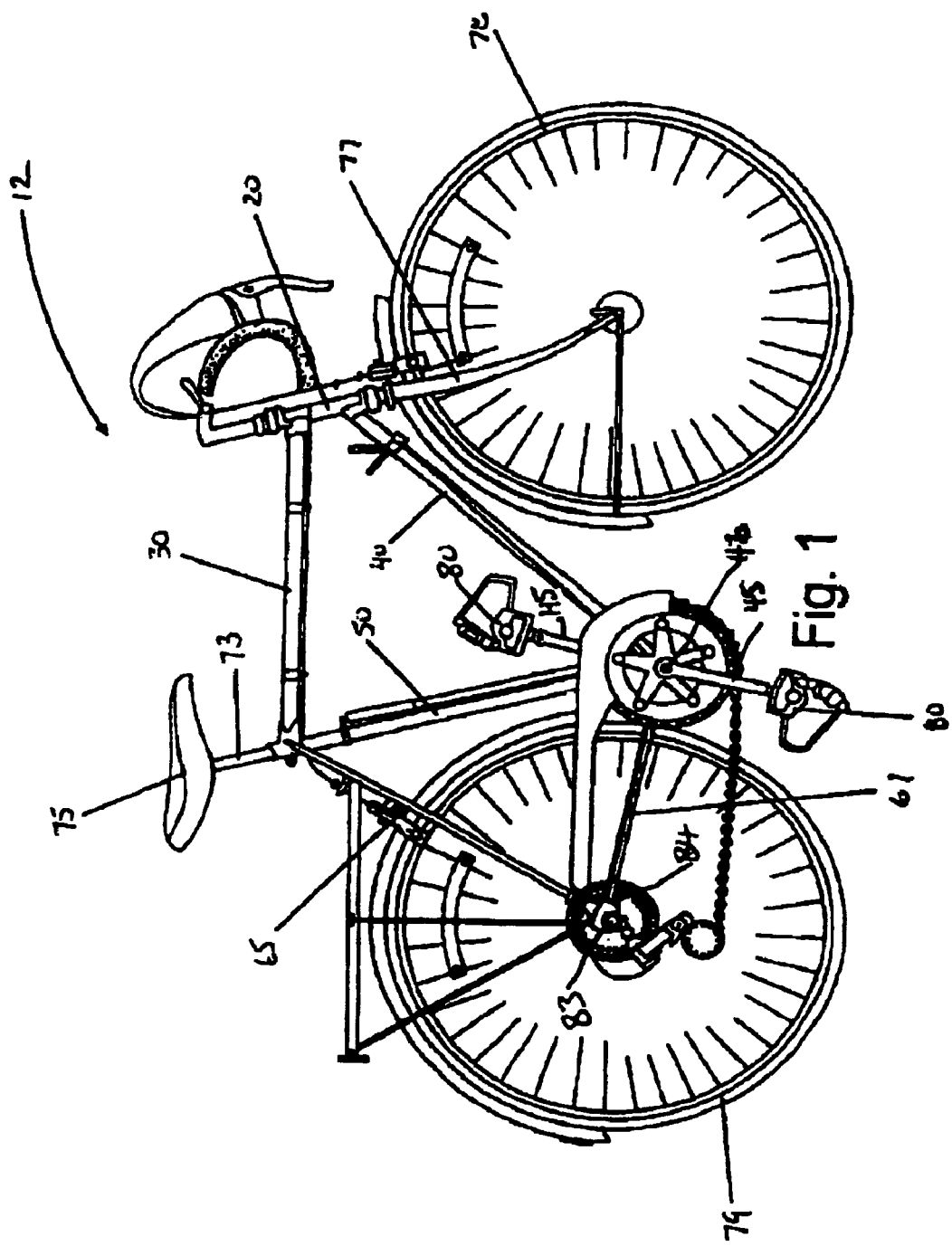
FIG. 1 is a side view of a bicycle in accordance with a first embodiment of the invention.

FIG. 1 is a side view of a bicycle 12 in accordance with a first embodiment of the invention. The bicycle 12 has a frame 10 comprising a head tube 20, a top tube 30, a down tube 40 and a seat tube 50. Each of these tubes are connected end-to-end to one another and form substantially a closed main frame loop 14. A seat post 73 is supported by an upper end 51 of the seat tube 50 carrying a seat 75.

A fork 77 is rotatably coupled to the head tube 20 to extend through the head tube carrying at an upper end to the handlebars. The fork 77 splits into a pair of arms supporting the front wheel 78. A seatstay 65 and a chainstay 67 extend rearwardly from the seat tube 50 and support a rear wheel 79 journalled on a rear axle 83 extending between the rear ends 84 of the chainstays 67. Two pedals 80 are carried on respective pedal crank arms 45 secured to a pedal axle 46 journalled in a pedal crank journal having (not seen in FIG. 1) secured proximate the junction of seat tube 50 and down tube 40.

Through all of the drawings the same reference numbers are used to refer to similar elements.

Reference is made to FIGS. 2 to 12 which show a bicycle frame 10 in accordance with a second embodiment of the invention.

Figure 2:
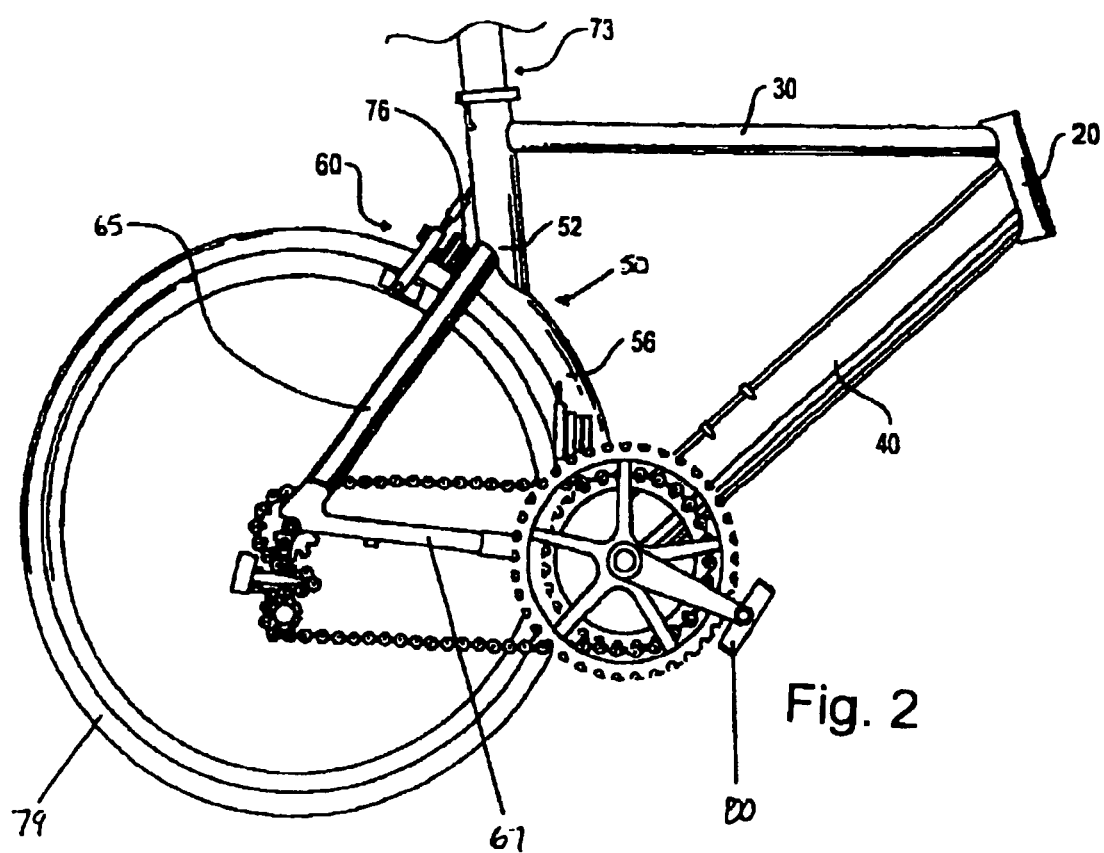
FIG. 2 is a partial side view of portions of a bicycle in accordance with a second embodiment of the invention showing the bicycle frame and the rear wheel.

FIG. 2 is a right side view of a bicycle however without the seat, handlebars, front fork or front wheel. In the second embodiment in FIGS. 2 to 6 the seat tube 50 comprises an upper tube section 52 and a lower tube section 56. FIGS. 3 to 6 show various views of the bicycle frame 10 alone.

Figure 3:
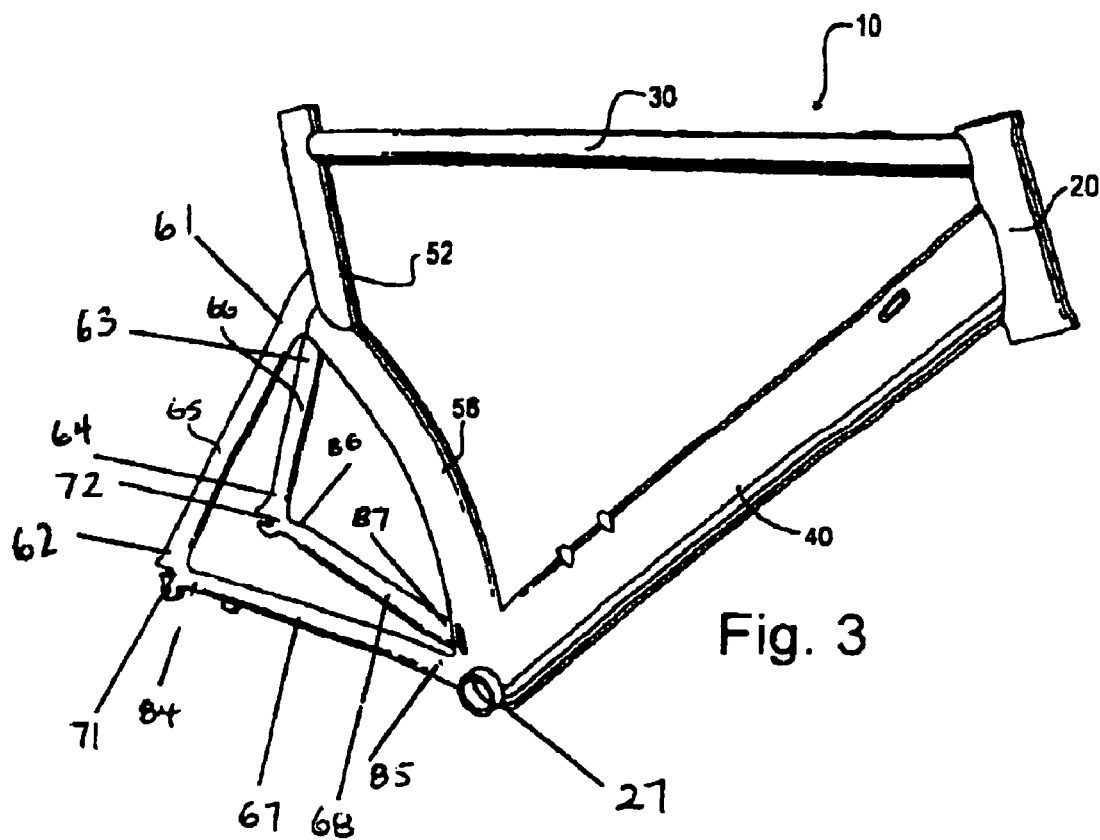
FIG. 3 is a perspective right side view of the bicycle frame shown in FIG. 2.
Figure 4:
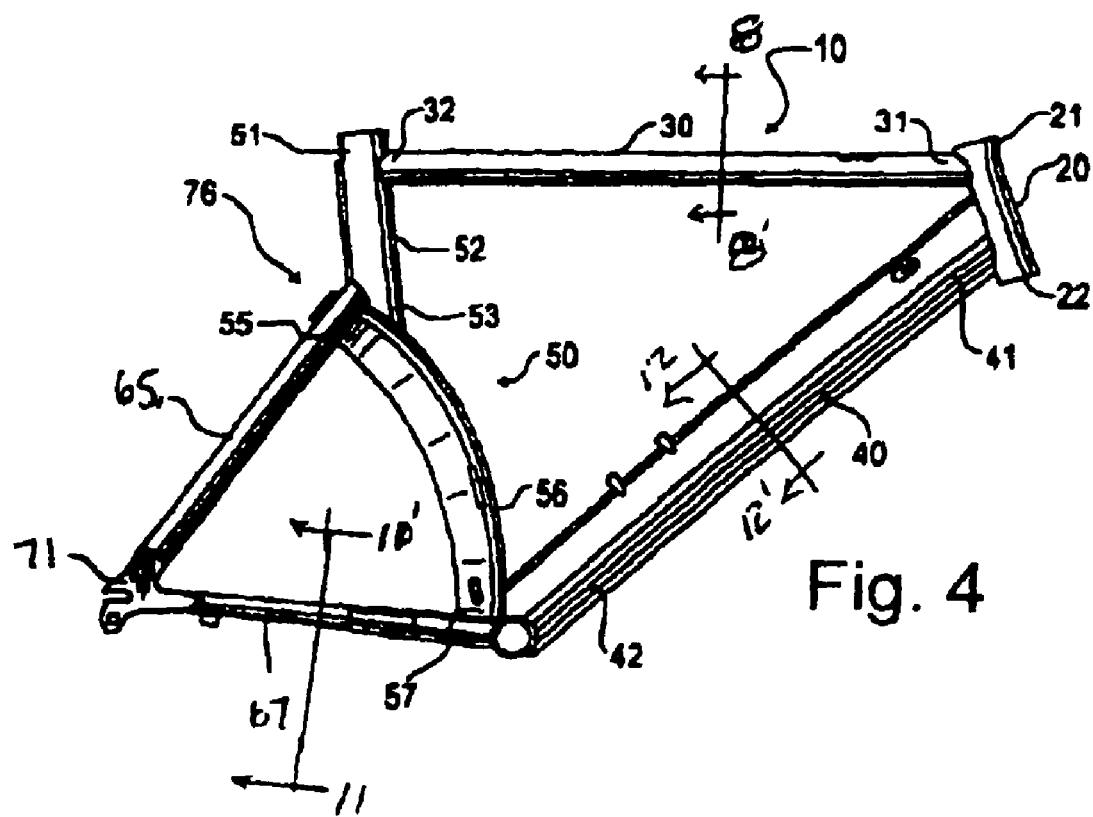
FIG. 4 is a right side view of the bicycle frame of FIG. 2.

As in FIG. 1, the bicycle frame 10 as best seen in FIGS. 3 and 4 includes a head tube 20, a top tube 30, a down tube 40, a seat tube 30, a right hand chainstay 67, a left hand chainstay 68, a right hand seat stay 65 and a left hand seatstay 66. The head tube 20 has an upper end 21 and a lower end 22. The top tube 30 has a front end 31 and a rear end 32. The down tube has a front end 41 and a rear end 42. The seat tube 50 has an upper end 51 and a lower end 57. The seat tube has an upper tubular portion 52 which has the upper end 51 and a lower end 53; and a lower tubular portion 56 which has an upper end 55 and the lower end 57.

Figure 5:
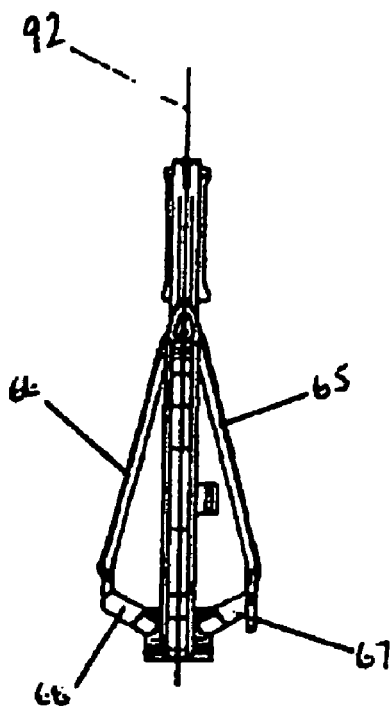
FIG. 5 is a rear view of the bicycle frame shown in FIG. 2.

FIG. 5 is a rear view of the bicycle frame of FIG. 3 and additionally shows a flat longitudinal central plane 92 that runs through each of the head tube 20, top tube 30, down tube 40 and seat tube 50. In particular, the flat longitudinal central plane 92 runs through a longitudinal axis 90 centrally of each of the head tube 20, top tube 30, down tube 40 and seat tube 50.

Figure 6:
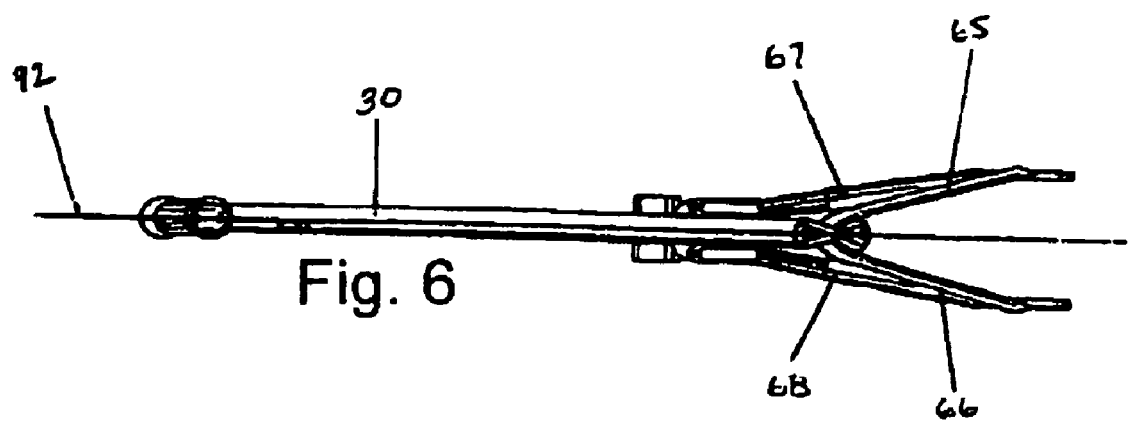
FIG. 6 is a top view of the bicycle frame shown in FIG. 2.

FIG. 6 is a top view of the bicycle frame of FIG. 3. FIG. 6 also shows the flat longitudinal central plane 92.

The front end 31 of the top tube 30 is the top end 21 of the head tube 20. The front end 41 of the down tube 40 is connected to the lower end 22 of the head tube 20. The top tube 30 and down tube 40 diverge away from each other as they extend rearwardly from the head tube 20. The rear end 42 of the down tube 40 is coupled to the lower end 57 of the seat tube 50. The rear end 32 of the top tube 30 is connected to the top end 51 of the seat tube 51.

The right hand chainstay 67 has a front end 85 and a rear end 84. The left hand chainstay 68 has a front end 87 and a rear end 86. The right hand seatstay has an upper end 61 and a lower end 62. The left hand seatstay 66 has an upper end 63 and a lower end 62. The front end 85 of the right chainstay 67 is connected to the lower end 57 of the seat tube 50 on a right side thereof. The upper end 61 of the right seatstay 65 is connected to the seat stay 50 spaced upwardly from the front end 85 of the right chainstay 67. The rear end 84 of the right chainstay 67 is connected to the lower end 62 of the right seatstay 65.

The front end 87 of the left chainstay 68 is connected to the lower end 57 of the seat tube 50 on a left side thereof. The upper end 63 of the left seatstay 66 is connected to the seat stay 50 spaced upwardly from the front end 87 of the left chainstay 68. The rear end 86 of the left chainstay 68 is connected to the lower end 64 of the left seatstay 66.

Proximate the juncture between the lower end 57 of the seat tube 50 and the rear end 42 of the down tube 40, a pedal crank journal housing 27 is provided adapted to journal an axle such as the axle 46 for the pedals shown in FIG. 1.

The rear ends 84 and 86 of the chainstays 67 and 68 each carry an axle slotway 71 and 72 adapted to receive a rear axle such as the axle 83 for the rear wheel 79 shown in FIG. 1.

The head tube 20, top tube 30, down tube 40 and seat tube 50 form a closed main frame loop indicated as 14. The right chainstay 67, right seatstay 65 and the seat tube 50 between the front end of the right chainstay 67 and the upper end of the right seatstay 65 form a closed right rear frame loop indicated as 15. The left chainstay 68, left seatstay 66 and the seat tube 50 between the front end of the left chainstay 68 and the upper end of the left seatstay 66 form a closed left rear frame loop indicated as 16.

Each of the head tube 20, top tube 30, down tube 40 and seat tube 50 are elongate members disposed about their own longitudinal axis 90. The longitudinal axis of each of the head tube 20, top tube 30, down tube 40 and seat tube 50 lie in the same flat central plane 92 best seen in the side and top view of FIGS. 5 and 6. Thus, mainframe loop 14 is disposed about and lies centred on the flat central plane 92.

Figure 7:
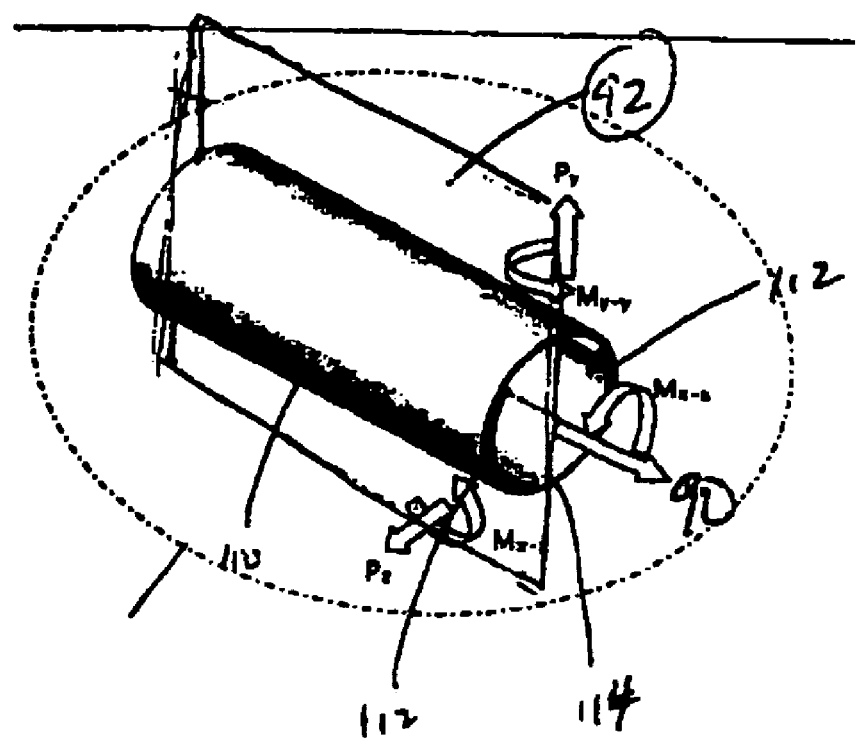
FIG. 7 is an enlarged perspective view of a section of the top tube of the frame of FIGS. 1 or 2.

FIG. 7 illustrates a section of the top tube 30 from either FIG. 1 or FIG. 3 in which the central plane 92 is schematically illustrated in dashed lines. The top tube 30 is disposed about its longitudinal axis 90 which extends centrally therethrough.

Figure 8:
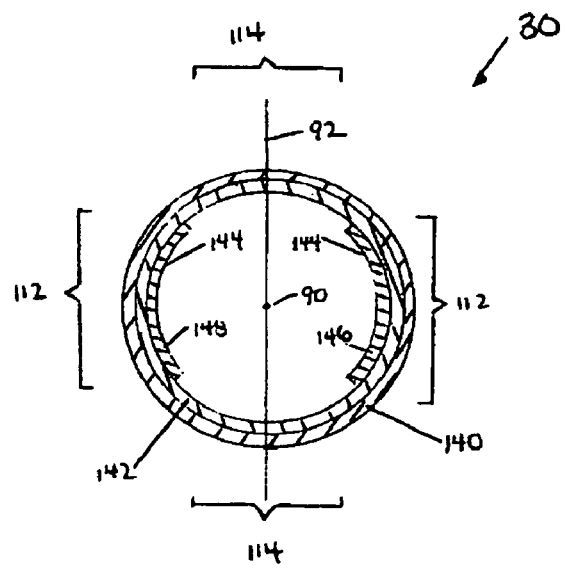
FIG. 8 is a cross-sectional view along section 8-8" in FIG. 4.

FIG. 8 shows an end view of the section of the top tube 30 in FIG. 8 and also represents a cross-sectional view through section lines 8-8' in FIG. 4.

In accordance with the present invention, the top tube 30 has an annular circumferential wall 110 about its longitudinal axis 90. The wall 110 is symmetrical about the central plane 92, that is on each side of the main frame loop 14. The wall has side wall portions 112 which are remote from the central plane 92 and central wall portions 114 which are proximate the central plane 92. The side wall portions 112 remote from the central plane 92 are reinforced compared to the central wall portions 114 proximate the central plane 92. Reinforcing of the side wall portions 112 is illustrated by the side wall portions 112 being increased radial thickness as contrasted with the central wall portions 114, on the assumption the nature of the material forming the wall will have substantially uniform density and/or strength for the same thickness and increased stiffness with increased thickness. Of course if the material forming the walls has different strengths for different thickness, as for example, using different materials or the same material but in different densities or proportions, the thickness need not necessarily vary. However, the side wall portions may be reinforced by adding additional material or stiffer material.

FIG. 8 shows the top tube 30 as being constructed from two circumferentially extending layers of fibre reinforced composite material such as graphite epoxy more commonly referred to as carbon fibre epoxy. The layers are an outer circumferential extending layer 140 whose internal surface is fused with an outer surface of an inner circumferentially extending layer 142. As reinforcing a reinforcing layer 144 is provided however merely on an interior surface of the layer 142 along side wall portions remote from the central plane 92 and not over the central wall portions proximate the central plane 92 at the top and bottom as seen. The reinforcing layer 144 may comprise two elongate strips 146 and 148 of the fibre reinforced composite material along the interior sides of the tube formed by the layers 140 and 142. One or two of more of such cylindrically extending layers 140 and 142 may be provided. In an alternate embodiment, the reinforcing layer 144 may vary in width and/or thickness along the interior of the tubes. A varying width and/or thickness allows adjustments to the stiffness of the tubes.

Figure 9:
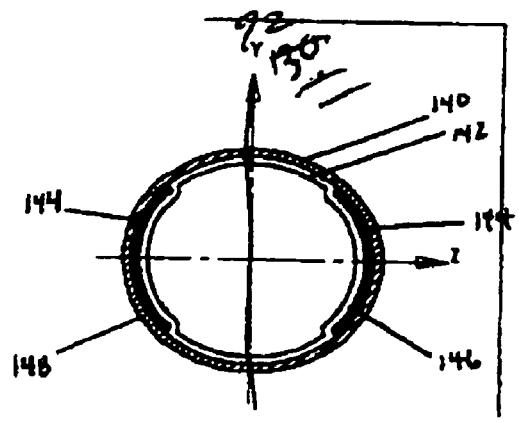
FIG. 9 is a cross-sectional view as in FIG. 8 but showing a second alternate reinforcing construction.

FIG. 9 shows an alternate construction for the top tube 30 in which the reinforcing layer 144 is provided as two stripes 146 and 148 over the side wall portions remote from the central plane 92 sandwiched between the inner layer 142 and the outer layer 140. The sidewall portions may be reinforced by adding additional material, stiffer material or foam material. The foam material may be sandwiched between the inner layer 140 and the outer layer 142.

Figure 10:
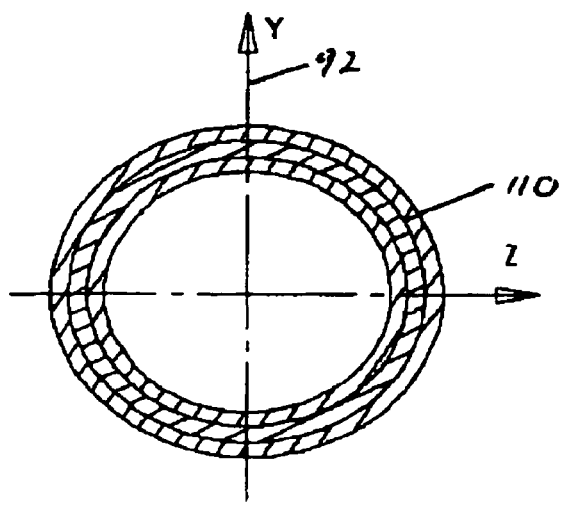
FIG. 10 is a cross-sectional view as in FIG. 8 but showing a tube construction without reinforcing.

FIG. 10 illustrates an alternate form of the top tube 30 in which the top tube 30 is not reinforced but is intended to be a tube having a circumferential wall 110 of uniform thickness and material strength throughout its circumference. This is the tube design commonly in bicycle frames.

FIG. 7 schematically illustrates forces or loads that the bicycle frame 10 is subjected to, namely:

Px being a force in the direction of the longitudinal axis 90,
Py being a force in the central plane 92 normal the longitudinal axis 90,
Pz being a force normal to the central plane,
Mx-x being a torsion load about the longitudinal axis 90,
Mz-z representing in plane bending,
My-y being out of plane bending.

It is appreciated that of these loads the loads My-y out of plane bending and Mx-x torsion are typically significant in determining the overall stiffness and resulting efficiencies of the bicycle frame 10. These loads are resisted with a bicycle frame tube having reinforced side walls having a construction as illustrated in FIGS. 7, 8 and 9, while reducing the overall weight of the tube compared to a tube of uniform wall thickness. Reducing the weight of the tubes reduces the overall weight of the bicycle while attaining the same stiffness as bicycles with tubes constructed with reinforcement around the entirety of the tube.

Whereas FIGS. 7, 8 and 9 each illustrate a reinforced tube for a bike frame, FIG. 10 illustrates a tube which is not reinforced. In any bike frame, incorporating tubes, one or more of the tubes is to be reinforced in accordance with the present invention. The preferred embodiments show a frame 12 as having the head tube 20, top tube 30, down tube 40, seat tube 50, a pair of chainstays and a pair of seatstays. In accordance with the invention, one or more of these elements may be a reinforced tube as described. In one particularly preferred configuration, the frame 12 will have both the down tube 40 and the chainstays 67 and 68 as reinforced tubes.

In another preferred configuration, each of the tubes of the mainframe loop 14 are reinforced tubes. In another preferred configuration, at least one of the chainstays and the seatstays are reinforced tubes. In another preferred configuration, all of the chainstays and the seatstays are reinforced tubes.

In one embodiment, the pair of seat stays are symmetrical of each other about the central plane 92. The pair of chainstays are also symmetrical of each other about the central plane 92. Reference is made to FIG. 11 which schematically illustrates a cross-sectional view along section line 10-10' in FIG. 4 and shows the two chainstays 67 and 68 in cross-section on either side of the central plane 92. Each chainstay, as well as each seatstay although not shown, are similar to the tubes of the mainframe loop 14 and comprise a hollow tube extending about its own longitudinal axis 190 and having a circumferential wall 110. At each point 191 along the longitudinal axis 190 of each chainstay or seatstay, the tube of the chainstay or seatstay is symmetrical about a line of symmetry 193 through such point 191 normal the longitudinal axis 190 and parallel to the central plane 92. The circumferential wall 110 of the chainstays is shown reinforced over side wall portions 112 remote from the line of symmetry 193 compared to central wall portions 122. As seen in FIG. 11, each of the chainstays has a generally elliptical circumferential wall 110.

FIG. 12 shows an alternate construction for the seatstays. FIG. 12 additionally shows an alternate construction for the chainstays. In this embodiment the pair of seatstays or chainstays are symmetrical about the central plane 92 but are not symmetrically about their line of symmetry 193. In particular, in this embodiment the sidewall reinforcement 150 on the sidewall furthest from the central plane 92 is thicker than the sidewall closer to the central plane 92.

FIG. 13 shows a farther alternate construction similar to that illustrated in FIG. 12 but where the reinforcement sidewalls 152 furthest from the central plane 92 are thicker and taller than the reinforcement in the sidewalls closer to the central plane 92.

FIG. 14 shows a still further alternate construction for the seatstays and/or chainstays similar to that illustrated in FIG. 12 but where the reinforcement on the sidewalls 154 furthest from the central plane 92 are made of a stiffer material than the reinforcement on the sidewalls closer to the central plane.

In a further alternate construction, the seatstays are not symmetrical about the central plane 92. Furthermore, the chainstays are not symmetrical about the central plane 92.

Figure 15:
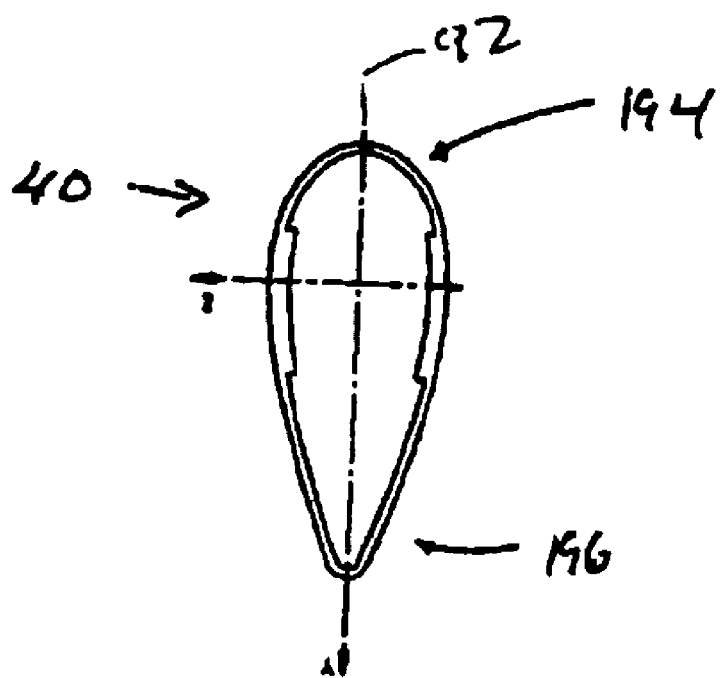
FIG. 15 is a cross-sectional view along section 12-12' in FIG. 4.

FIG. 15 shows a cross-sectional view through section line 12-12' in FIG. 4 and shows the down tube 40 as tube of a generally airfoil shape as is advantageous with a forwardly directed edge 194 to be directed into the air and with the tube taping towards its rear edge 196. The cross-section shows the down tube 40 is shown reinforced on its side wall portion remote from the central plane 92.

Figure 16:
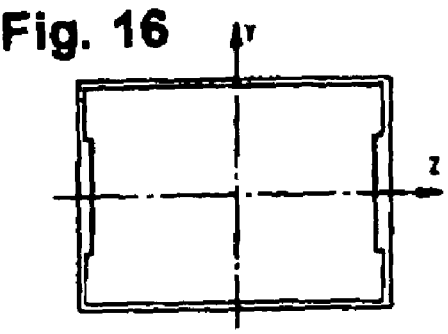
FIGS. 16 to 19 are cross-sectional views through other reinforced bicycle tubes, chainstays or seatstays.
Figure 17:
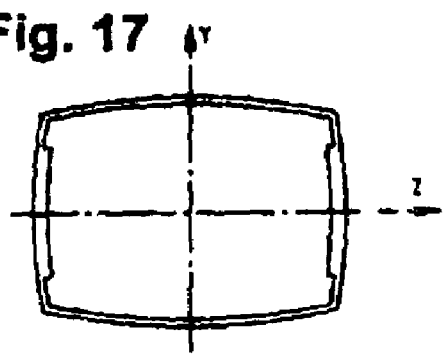
Figure 18:
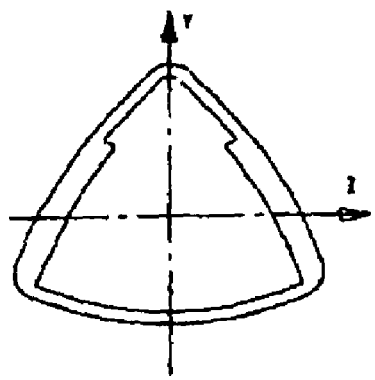
Figure 19:
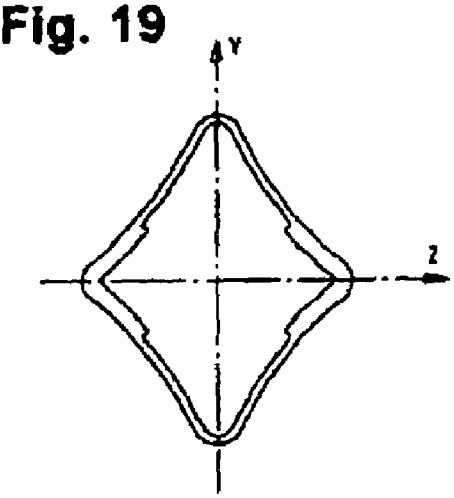

FIGS. 16, 17, 18 and 19 show other possible configurations for reinforced tubes for bicycle frames including a rectangular in FIG. 16, a camber sided rectangle in FIG. 17 a camber sided triangle on FIG. 18 and a diamond in FIG. 19, each of which having reinforced side wall portions configured to central wall portions, having regard to the location of the conceptual central plane 92. Each of the tubes, chainstays or seatstays bay be shaped as any of these configurations or may be circular elliptical or airfoil configuration detailed earlier.

Figure 20:
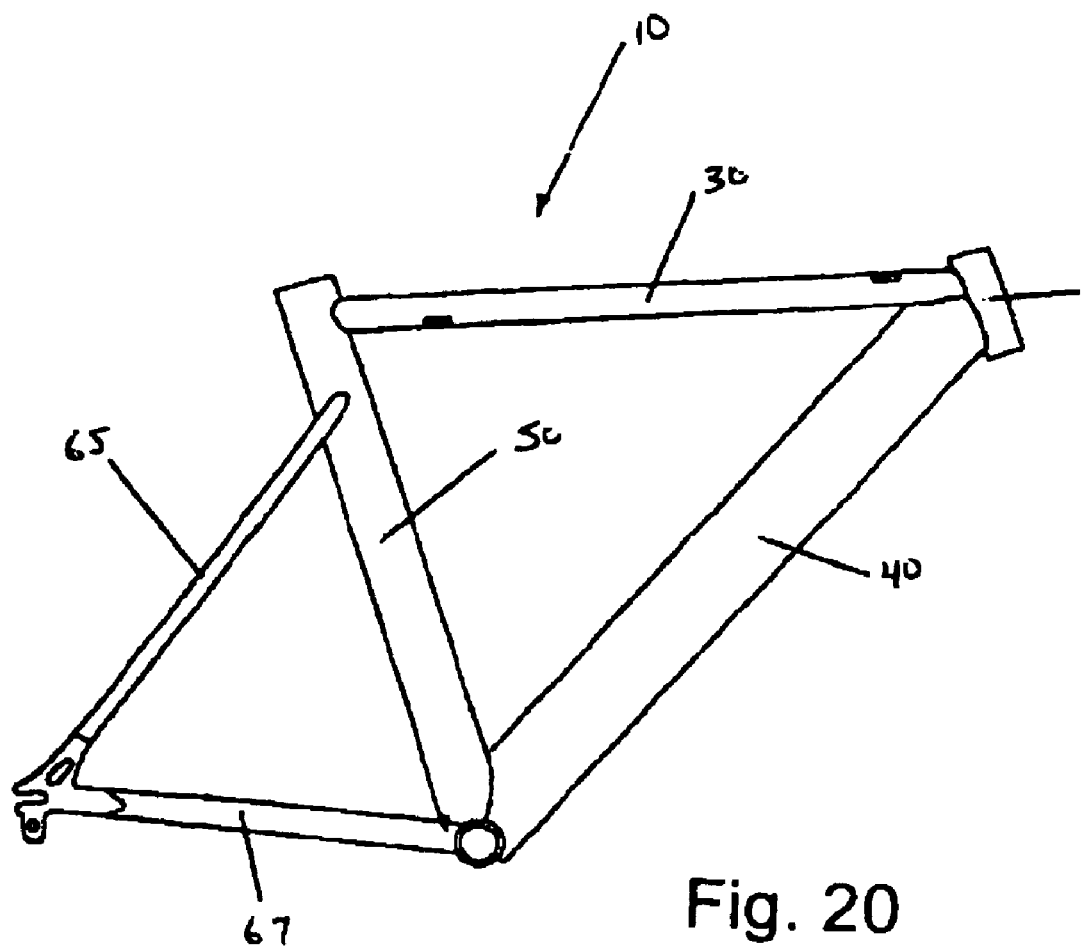
FIG. 20 is a side view of a bicycle frame in accordance with a third embodiment of the invention.
Figure 21:
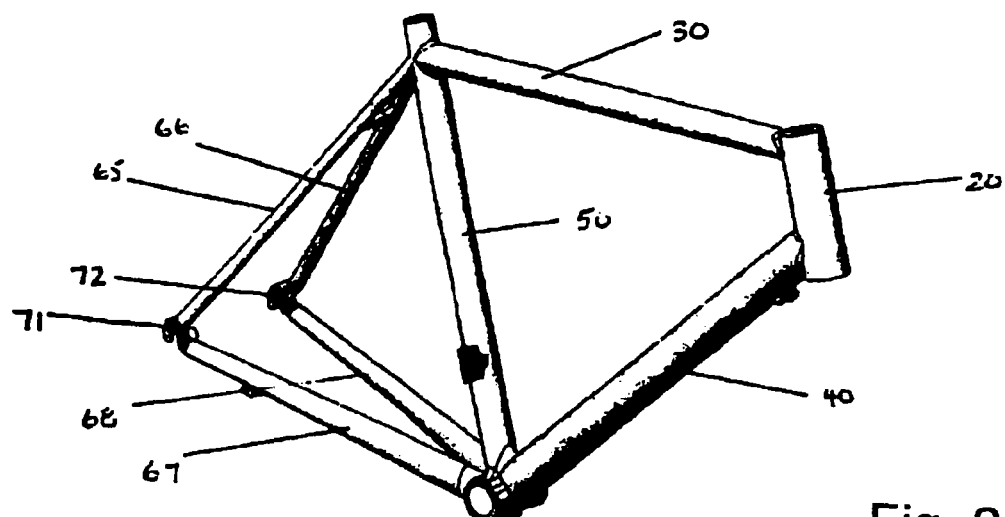
FIG. 21 is a perspective view of a bicycle frame in accordance with a forth embodiment of the invention.
Figure 22:
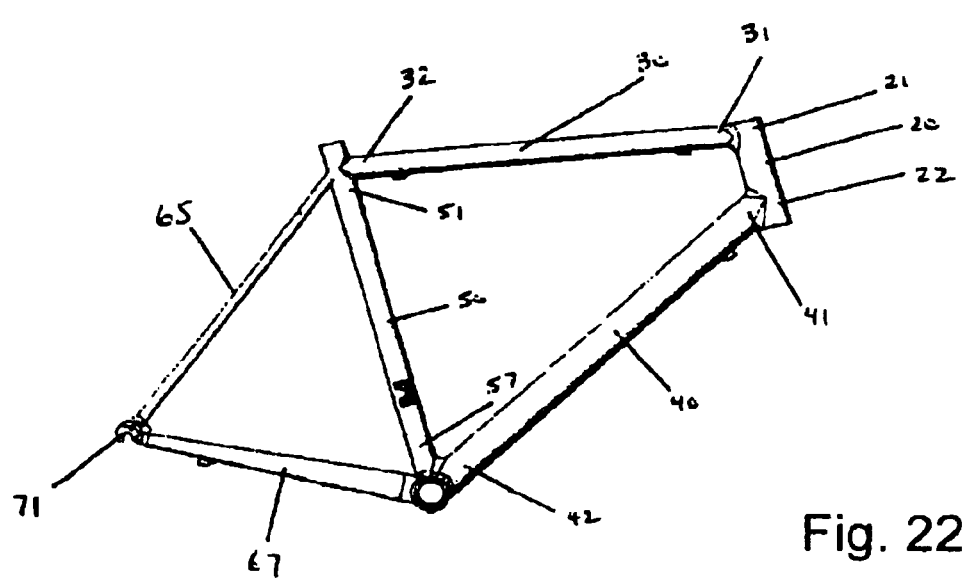
FIG. 22 is a side view of the frame of FIG. 17.

FIGS. 20, 21 and 22 show two alternate embodiments of bicycle frames in accordance with the present invention differing in respect of the relative diameter and length and cross-sectional shape of their various tubes and in the location of junction of the tubes with each other.

Figure 23:
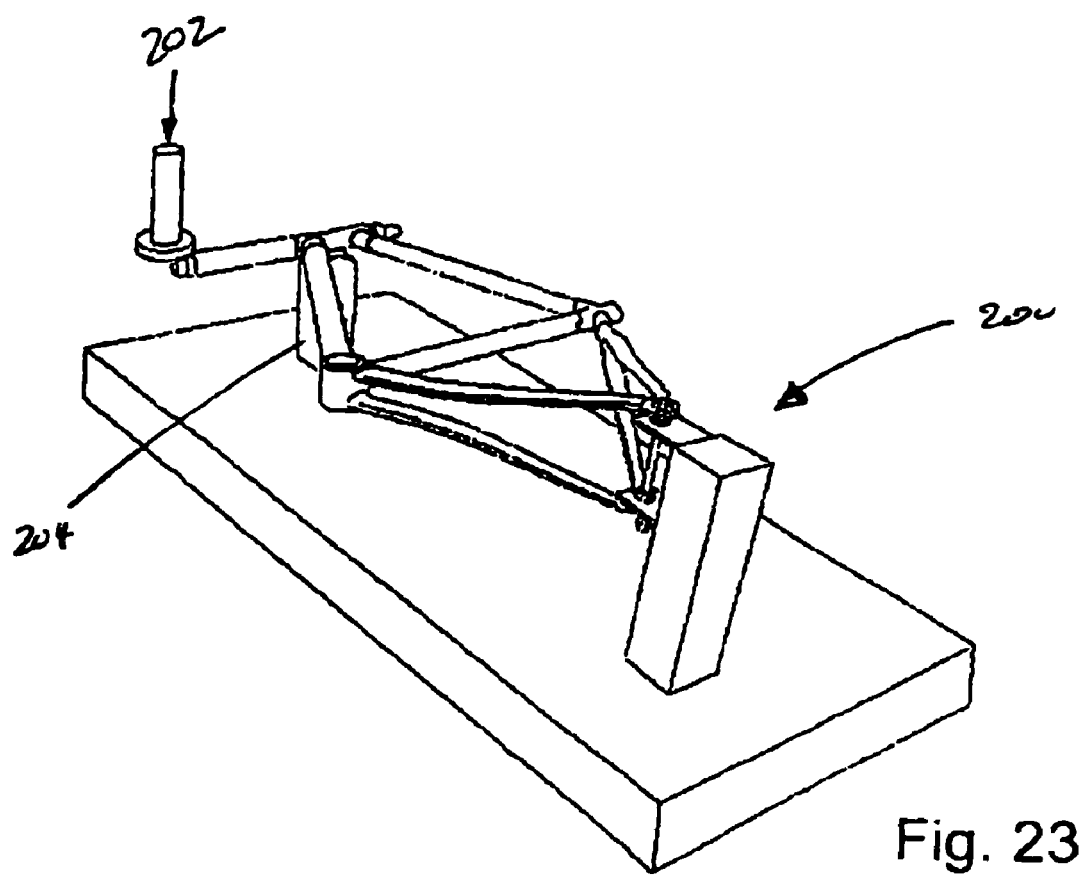
FIGS. 23 and 24 are a pictorial view of two frame testing apparatus.

FIG. 23 illustrates a first testing apparatus 200 being used to test the rigidity of a bicycle frame 10 by holding the rear ends of the chainstay fixed and applying a load 202 to an end of an extension of the head tube with the head tube received for pivoting on a curved, upper surface of a fixed fulcrum post 204.

Figure 24:
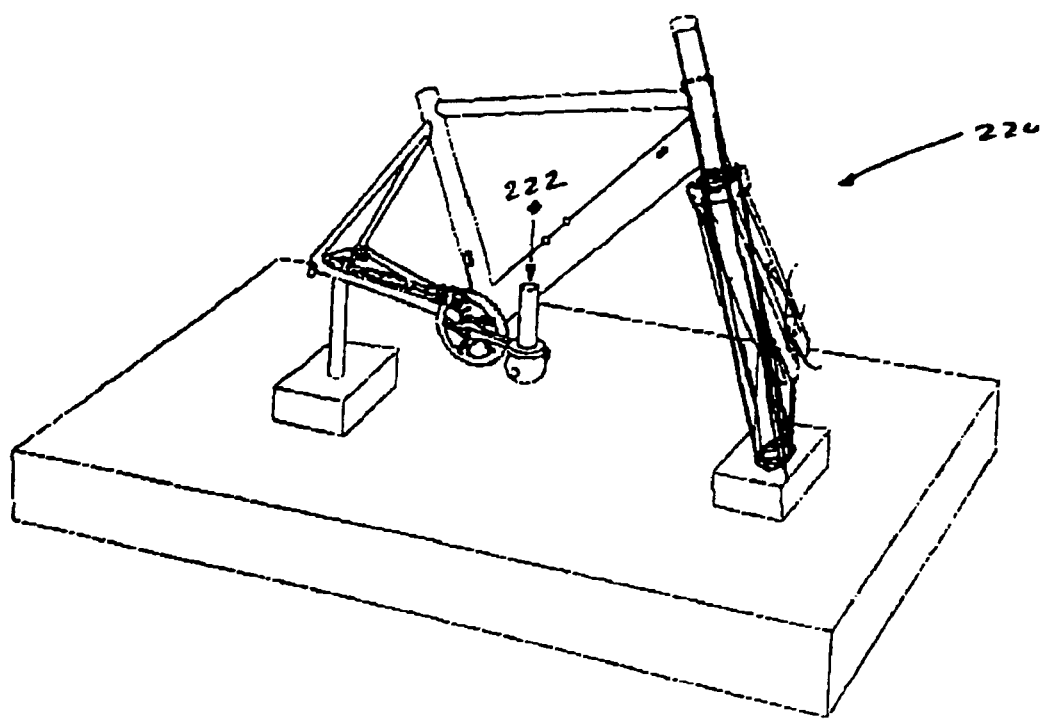

FIG. 24 illustrates a second testing apparatus 220 used to test the rigidity of a bicycle frame 10 by holding the rear end of the chainstay fixed holding the head tube fixed and applying a load 222 onto a pedal on one side of the frame.

The testing apparatuses of FIGS. 23 and 24 are common testing apparatuses used to determine the overall stiffness in bicycle tubes.

The applicant has appreciated that in the frame construction shown in FIGS. 2 to 22 bending of the frame in a lateral direction outside the central plane is reduced while in plane bending in the vertical direction is not reduced.

Figure 25:
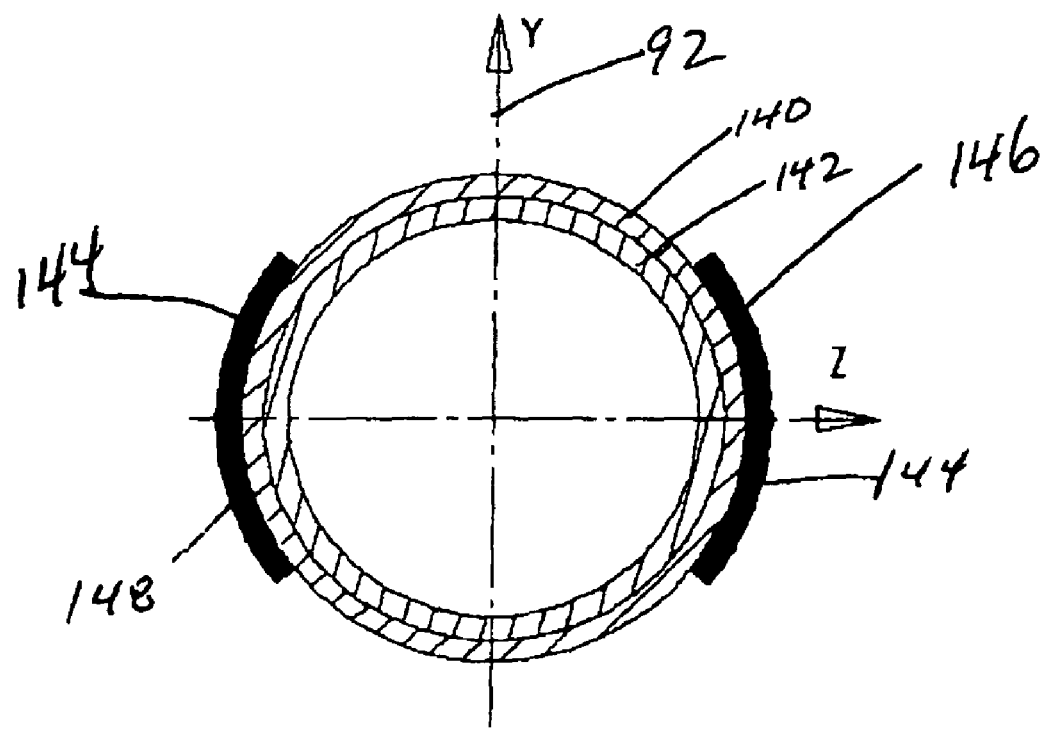
FIG. 25 is a cross-sectional view as in FIG. 8 but showing a third alternate reinforcing construction.

FIG. 25 shows an alternate construction for the tubes, chainstays or seatstays in which the reinforcing layer 144 is provided as two stripes 146 and 148 over the side wall portions remote from the central plane 92 provided on the exterior of the outer layer 140.

While the invention will be described in conjunction with the illustrated embodiments it is understood that it is not intended to limit the invention to such embodiments. On the contrary, it is intended to cover all alternatives, modifications and equivalents as may be included within the spirit and scope of the invention as defined by the following claims.

The embodiments of the invention in which an exclusive property or privilege is claimed are defined as follows:

1. A bicycle frame comprising:
   a top tube with a front end and a rear end,
   a head tube with a top end and a lower end,
   a down tube with a front end and a rear end,
   a seat tube with a top end and lower end,
   a pair of chainstays each with a front end and rear end, and
   a pair of seatstays each with a front end and rear end,
   the front end of the top tube connected to the top end of the head tube,
   the front end of the down tube connected to the lower end of the head tube,
   the top tube and down tube diverging away from each other and extend rearwardly from the head tube,
   the rear end of the down tube coupled to the lower end of the seat tube,
   the rear end of the top tube connected to the top end of the seat tube,
   the top tube, head tube, down tube and seat tube substantially forming a closed main frame loop,
   the head tube adapted to be coupled to a pivotable front fork which carries a front wheel and handlebars,
   the top tube, head tube, down tube, and seat tube each comprises a tubular member extending about their own longitudinal axis,
   the longitudinal axis of the head tube lying in a flat longitudinal central plane which is parallel to a forward direction of travel of the bicycle frame,
   each tubular member having by a circumferential wall about their longitudinal axis, each point along the length of each the longitudinal axis having a reference line through each point normal the longitudinal axis and parallel to the central plane,
   selected of the tubular members being reinforced tubular members,
   the circumferential wall of the reinforced tubular members having remote portions remote from the reference lines and proximate portions priximate the reference lines
   the remote portions being reinforced compared to the proximate portions to increase the resistance of the reinforced tubular member to lateral out of plane bending compared to in plane bending in the vertical direction,
   the down tube being a reinforced tubular member,
   the pair of chainstays comprising a left chainstay and a right chainstay being on opposite sides of the central plane,
   the pair of seatstays comprising a left seatstay and a right seatstay being on opposite sides of the central plane,
   the front end of the right chainstay connected to the main frame loop proximate the junction of the seat tube and the down tube on a right side of the central plane,
   the front end of the right seatstays connected to the seat tube on a right side of the central plane spaced upwardly from the front ends of the chainstays,
   the rear end of the right chainstay connected to the rear end of the right seat stay on the right side of the central plane rearward of the seat tube,
   the front end of the left chainstay connected to the main frame loop proximate the junction of the seat tube and the down tube on a left side of the central plane,
   the front end of the left seatstays connected to the seat tube on a left side of the central plane spaced upwardly from the front ends of the chainstays,
   the rear end of the left chainstay connected to the rear end of the left seatstay on the left side of the central plane rearward of the seat tube,
   the right chainstay, the right seatstay, and the seat tube substantially form a closed right rear frame loop,
   the left chainstay, the left seatstay, and the seat tube substantially form a closed left rear frame loop,
   the rear ends of the pair of chainstays adapted to support a rear wheel journalled on an axle extending therebetween normal to the central plane,
   each chainstay and each seatstay comprise a tubular element extending about their own longitudinal axis,
   each reinforced tubular element having a circumferential wall about its longitudinal axis, each point along the length of the longitudinal axis having a reference line through each point normal the longitudinal axis and parallel to the central plane, selected of the tubular elements being reinforced tubular elements, the circumferential wall of the reinforced tubular elements having remote portions remote from the reference lines and proximate portions proximate the reference lines the remote portions being reinforced compared to the proximate portions to increase the resistance of the reinforced tubular element to resisting lateral out of plane bending compared to in plane bending in a vertical direction, the chainstays each being a reinforced tubular element, wherein each reinforced tubular element is formed from layers of fiber reinforced composite materials including:

a radially inner circumferentially extending layer, a radially outer circumferentially extending layer, and a reinforcing layer of fiber reinforced composite material provided over each of the wall portions remote from the lines of symmetry.

2. The bicycle frame as claimed in claim 1 wherein the remote portions have a radial thickness greater than a radial thickness of the proximate portions, each radial thickness measured radially relative the longitudinal axis of each respective tubular member.

3. The bicycle frame as claimed in claim 2 wherein the circumferential wall is formed from fiber reinforced composite materials.

4. The bicycle frame as claimed in claim 1 wherein the left chainstay and right chainstay are symmetrically of each other about the central plane.

5. The bicycle frame as claimed in claim 1 wherein the left seatstay and right seatstay are symmetrically of each other about the central plane.

6. The bicycle frame as claimed in clam 1 wherein the remote portions have a radial thickness greater than a radial thickness of the proximate portions each radial thickness measured radially relative the longitudinal axis of each respective tubular element.

7. The bicycle frame as claimed in claim 6 wherein the circumferential wall is formed from fiber reinforced composite materials.

8. The bicycle frame as claimed in claim 1 wherein additionally at least one of the top tube, head tube and seat tube are reinforced tubular members.

9. The bicycle frame as claimed in claim 1 wherein all of the top tube, head tube and seat tube are reinforced tubular members.

10. The bicycle frame as claimed in claim 1 wherein additionally each seatstay is a reinforced tubular element.

11. The bicycle frame as claimed in claim 7 wherein additionally each seatstay is a reinforced tubular element.

12. The bicycle frame as claimed in claim 8 wherein additionally each seatstay is a reinforced tubular element.

13. The bicycle frame as claimed in claim 1 wherein the rear end of the down tube is coupled to the lower end of the seat tube via pedal crank journal housing adapted to receive a pedal axle extending normal to the central plane to carry a pedal on each side of the central plane.

14. The bicycle frame as claimed in claim 1 wherein the reinforcing layer is intermediate the inner layer and the outer layer.

15. The bicycle frame as claimed in claim 1 wherein the reinforcing layer overlies the inner layer radially inward of the inner layer.

16. The bicycle frame as claimed in claim 1 wherein the fiber reinforced composite materials are carbon fiber epoxy.

17. The bicycle frame as claimed in claim 2 wherein additionally at least one of the top tube, head tube and seat tube are reinforced tubular members.

18. The bicycle frame as claimed in claim 2 wherein all of the top tube, head tube, down tube and seat tube are reinforced tubular members.

19. The bicycle frame as claimed in claim 18 wherein additionally each seatstay is a reinforced tubular element.

20. The bicycle frame as claimed in claim 1 wherein the reinforcing layer overlies the outer layer radially outward of the outer layer.

21. The bicycle frame as claimed in claim 9 wherein additionally each seatstay is a reinforced tubular element.

22. A bicycle frame comprising:

a top tube with a front end and a rear end, a head tube with a top end and a lower end, a down tube with a front end and a rear end, a seat tube with a top end and lower end, a pair of chainstays each with a front end and rear end, and a pair of seatstays each with a front end and rear end, the front end of the top tube connected to the top end of the head tube, the front end of the down tube connected to the lower end of the head tube, the top tube and down tube diverging away from each other and extend rearwardly from the head tube, the rear end of the down tube coupled to the lower end of the seat tube, the rear end of the top tube connected to the top end of the seat tube, the top tube, head tube, down tube and seat tube substantially forming a closed main frame loop, the head tube adapted to be coupled to a pivotable front fork which carries a front wheel and handlebars, the top tube, head tube, down tube, and seat tube each comprises a tubular member extending about their own longitudinal axis, the longitudinal axis of the head tube lying in a flat longitudinal central plane which is parallel to a forward direction of travel of the bicycle frame each tubular member having by a circumferential wall about their longitudinal axis, each point along the length of each the longitudinal axis having a reference line through each point normal the longitudinal axis and parallel to the central plane, selected of the tubular members being reinforced tubular members, the circumferential wall of the reinforced tubular members having remote portions remote from the reference lines and proximate portions proximate the reference lines, the remote portions being reinforced compared to the proximate portions to increase the resistance of the reinforced tubular member to lateral out of plane bending compared to in plane bending in the vertical direction, wherein each reinforced tubular member is formed from layers of fiber reinforced composite materials including:

a radially inner circumferentially extending layer, a radially outer circumferentially extending layer, and a reinforcing layer, the reinforcing layer provided over each a of the remote portions.

23. The bicycle frame as claimed in claim 22 wherein the reinforcing layer overlies the inner layer radially inward of the inner layer.

24. The bicycle frame as claimed in claim 22 wherein the fiber reinforced composite materials are carbon fiber epoxy.

25. The bicycle frame as claimed in claim 22 wherein the remote portions have a radial thickness greater than a radial thickness of the proximate portions, each radial thickness measured radially relative the longitudinal axis of each respective tubular member.

26. A bicycle frame comprising:
a top tube with a front end and a rear end,
a head tube with a top end and a lower end,
a down tube with a front end and a rear end,
a seat tube with a top end and lower end,
a pair of chainstays each with a front end and rear end, and
a pair of seatstays each with a front end and rear end,
the front end of the top tube connected to the top end of the head tube,
the front end of the down tube connected to the lower end of the head tube,
the top tube and down tube diverging away from each other and extend rearwardly from the head tube,
the rear end of the down tube coupled to the lower end of the seat tube,
the rear end of the top tube connected to the top end of the seat tube,
the top tube, head tube, down tube and seat tube substantially forming a closed main frame loop,
the head tube adapted to be coupled to a pivotable front fork which carries a front wheel and handlebars,
the top tube, head tube, down tube, and seat tube each comprises a tubular member extending about their own longitudinal axis,
the longitudinal axis of the head tube lying in a flat longitudinal central plane which is parallel to a forward direction of travel of the bicycle frame,
each tubular member having by a circumferential wall about their longitudinal axis, each point along the length of each the longitudinal axis having a reference line through each point normal the longitudinal axis and parallel to the central plane,
selected of the tubular members being reinforced tubular members,
the circumferential wall of the reinforced tubular members having remote portions remote from the reference lines and proximate portions proximate the reference lines,
the remote portions being reinforced compared to the proximate portions to increase the resistance of the reinforced tubular member to lateral out of plane bending compared to in plane bending in the vertical direction,
the pair of chainstays comprising a left chainstay and a right chainstay being on opposite sides of the central plane,
the pair of seatstays comprising a left seatstay and a right seatstay being on opposite sides of the central plane,
the front end of the right chainstay connected to the main frame loop proximate the junction of the seat tube and the down tube on a right side of the central plane,
the front end of the right seatstays connected to the seat tube on a right side of the central plane spaced upwardly from the front ends of the chainstays,
the rear end of the right chainstay connected to the rear end of the right seat stay on the right side of the central plane rearward of the seat tube,
the front end of the left chainstay connected to the main frame loop proximate the junction of the seat tube and the down tube on a left side of the central plane,
the front end of the left seatstays connected to the seat tube on a left side of the central plane spaced upwardly from the front ends of the chainstays,
the rear end of the left chainstay connected to the rear end of the left seatstay on the left side of the central plane rearward of the seat tube,
the right chainstay, the right seatstay, and the seat tube substantially form a closed right rear frame loop,
the left chainstay, the left seatstay, and the seat tube substantially form a closed left rear frame loop,
the rear ends of the pair of chainstays adapted to support a rear wheel journalled on an axle extending therebetween normal to the central plane,
each chainstay and each seatstay comprise a tubular element extending about their own longitudinal axis,
each reinforced tubular element having a circumferential wall about its longitudinal axis, each point along the length of the longitudinal axis having a reference line through each point normal the longitudinal axis and parallel to the central plane,
selected of the tubular elements being reinforced tubular elements,
the circumferential wall of the reinforced tubular elements having remote portions remote from the reference lines and proximate portions proximate the reference lines the remote portions being reinforced compared to the proximate portions to increase the resistance of the reinforced tubular element to resisting lateral out of plane bending compared to in plane bending in a vertical direction,
wherein each reinforced tubular member and each reinforced tubular element are formed from layers of fiber reinforced composite materials including:
a radially inner circumferentially extending layer,
a radially outer circumferentially extending layer, and
a reinforcing layer, the reinforcing layer provided over each of the remote portions.

27. The bicycle frame as claimed in claim 26 wherein the reinforcing layer overlies the inner layer radially inward of the inner layer.

28. The bicycle frame as claimed in claim 26 wherein the fiber reinforced composite materials are carbon fiber epoxy.

29. The bicycle frame as claimed in claim 26 wherein the remote portions have a radial thickness greater than a radial thickness of the proximate portions, each radial thickness measured radially relative the longitudinal axis of each respective tubular member and each respective tubular element.

30. The bicycle frame as claimed in claim 22 wherein the reinforcing layer is intermediate the inner layer and the outer layer.

31. The bicycle frame as claimed in claim 26 wherein the reinforcing layer is intermediate the inner layer and the outer layer.

32. The bicycle frame as claimed in claim 22 wherein the reinforcing layer overlies the outer layer radially outward of the outer layer.

33. The bicycle frame as claimed in claim 26 wherein the reinforcing layer overlies the outer layer radially outward of the outer layer.

34. The bicycle as claimed in claim 22 wherein
the down tube being a reinforced tubular member,
the pair of chainstays comprising a left chainstay and a right chainstay being on opposite sides of the central plane,
the pair of seatstays comprising a left seatstay and a right seatstay being on opposite sides of the central plane,
the front end of the right chainstay connected to the main frame loop proximate the junction of the seat tube and the down tube on a right side of the central plane,
the front end of the right seatstays connected to the seat tube on a right side of the central plane spaced upwardly from the front ends of the chainstays, the rear end of the right chainstay connected to the rear end of the right seat stay on the right side of the central plane rearward of the seat tube, the front end of the left chainstay connected to the main frame loop proximate the junction of the seat tube and the down tube on a left side of the central plane, the front end of the left seatstays connected to the seat tube on a left side of the central plane spaced upwardly from the front ends of the chainstays, the rear end of the left chainstay connected to the rear end of the left seatstay on the left side of the central plane rearward of the seat tube, the right chainstay, the right seatstay, and the seat tube substantially form a closed right rear frame loop, the left chainstay, the left seatstay, and the seat tube substantially form a closed left rear frame loop, the rear ends of the pair of chainstays adapted to support a rear wheel journalled on an axle extending therebetween normal to the central plane, each chainstay and each seatstay comprise a tubular element extending about their own longitudinal axis, each reinforced tubular element having a circumferential wall about its longitudinal axis, each point along the length of the longitudinal axis having a reference line through each point normal the longitudinal axis and parallel to the central plane, selected of the tubular elements being reinforced tubular elements, the circumferential wall of the reinforced tubular elements having remote portion remote from the reference lines and proximate portions proximate the reference lines the remote portions being reinforced compared to the proximate portions to increase the resistance of the reinforced tubular element to resisting lateral out of plane bending compared to in plane bending in a vertical direction, the chainstays each being a reinforced tubular member.

35. The bicycle frame as claimed in claim 34 wherein the reinforcing layer is intermediate the inner layer and the outer layer.

36. The bicycle frame as claimed in claim 34 wherein the reinforcing layer overlies the inner layer radially inward of the inner layer.

37. The bicycle frame as claimed in claim 34 wherein the fiber reinforced composite materials are carbon fiber epoxy.

38. The bicycle frame as claimed in claim 34 wherein the reinforcing layer overlies the outer layer radially outward of the outer layer.

* * * * *